United States Patent
Fulton et al.

(10) Patent No.: US 8,195,844 B2
(45) Date of Patent: Jun. 5, 2012

(54) SYSTEMS, DEVICES, AND/OR METHODS FOR MANAGING COMMUNICATIONS

(75) Inventors: Temple L. Fulton, Elizabethton, TN (US); Steven M. Hausman, Johnson City, TN (US); William K. Bryant, Johnson City, TN (US)

(73) Assignee: Siemens Aktiengesellschaft, Munich (DE)

( * ) Notice: Subject to any disclaimer, the term of this patent is extended or adjusted under 35 U.S.C. 154(b) by 296 days.

(21) Appl. No.: 12/211,260

(22) Filed: Sep. 16, 2008

(65) Prior Publication Data

US 2009/0083589 A1    Mar. 26, 2009

Related U.S. Application Data

(60) Provisional application No. 60/994,522, filed on Sep. 20, 2007, provisional application No. 60/994,530, filed on Sep. 20, 2007.

(51) Int. Cl.
*G06F 3/00* (2006.01)

(52) U.S. Cl. .................. 710/20; 710/5; 710/8; 710/15; 710/19; 710/29; 710/33; 710/48

(58) Field of Classification Search ................. 710/5, 8, 710/15, 19, 20, 29, 33, 48
See application file for complete search history.

(56) References Cited

U.S. PATENT DOCUMENTS

| | | | |
|---|---|---|---|
| 5,765,000 A | | 6/1998 | Mitchell |
| 6,052,812 A | * | 4/2000 | Chen et al. ............... 714/751 |
| 6,064,649 A | * | 5/2000 | Johnston ................. 370/310.2 |
| 6,151,689 A | * | 11/2000 | Garcia et al. ............... 714/49 |
| 6,546,521 B2 | * | 4/2003 | Boggs et al. ............. 714/800 |
| 6,931,647 B1 | | 8/2005 | Firth et al. |
| 2001/0055293 A1 | * | 12/2001 | Parsa et al. ............... 370/342 |
| 2009/0028178 A1 | * | 1/2009 | Coleman et al. .......... 370/464 |

FOREIGN PATENT DOCUMENTS

| WO | WO 96/21179 | 7/1996 |
|---|---|---|
| WO | WO96/21180 | 7/1996 |
| WO | WO 00/55697 A | 9/2000 |

\* cited by examiner

*Primary Examiner* — Eron J Sorrell
*Assistant Examiner* — Jasjit Vidwan

(57) ABSTRACT

Certain exemplary embodiments can provide a system, which can comprise a programmable logic controller (PLC). The system can comprise a serial communications port connected to the PLC. In certain exemplary embodiments, the system can comprise a controller adapted to enable a customer application program to access and control the serial communications port.

18 Claims, 3 Drawing Sheets

3000

SYSTEMS, DEVICES, AND/OR METHODS FOR MANAGING COMMUNICATIONS

CROSS-REFERENCE TO RELATED APPLICATIONS

This application claims priority to, and incorporates by reference herein in its entirety, U.S. Provisional Patent Application Ser. No. 60/994,522, filed 20 Sep. 2007, and U.S. Provisional Patent Application Ser. No. 60/994,530, filed 20 Sep. 2007.

BACKGROUND

U.S. Pat. No. 5,727,170 (Mitchell), which is incorporated by reference herein in its entirety, discloses that the "PLC has a user configurable protocol port attached thereto. Briefly stated, at the PLC communication port or as a result of a user program or I/O event, a special flag bit may be set which thereby allows the communication port to be activated. This is done by the flag bit causing an interrupt to occur in the PLC user program which allows a user to communicate with a user specified protocol scheme rather than the normal communication/programming protocol when this special bit is not set." See Abstract.

U.S. Pat. No. 5,765,000 (Mitchell), which is incorporated by reference herein in its entirety, discloses that the "scan cycle in a programmable logic controller is constructed so as to allow the PLC users program to execute an instruction to assign a user program section to which the PLC system is to transfer control upon the occurance of an instruction-specified event. Also allowed is the de-assignment of a user program section from an instruction-specified event. Moreover, the interrupt may happen at any portion of the PLC scan cycle and not merely at compilation time. This thereby allows for dynamically presetting values of characters and the like as well as pipelining of interrupts in the PLC." See Abstract.

SUMMARY

Certain exemplary embodiments can provide a system, which can comprise a programmable logic controller (PLC). The system can comprise a serial communications port connected to the PLC. In certain exemplary embodiments, the system can comprise a controller adapted to enable a customer application program to access and control the serial communications port.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
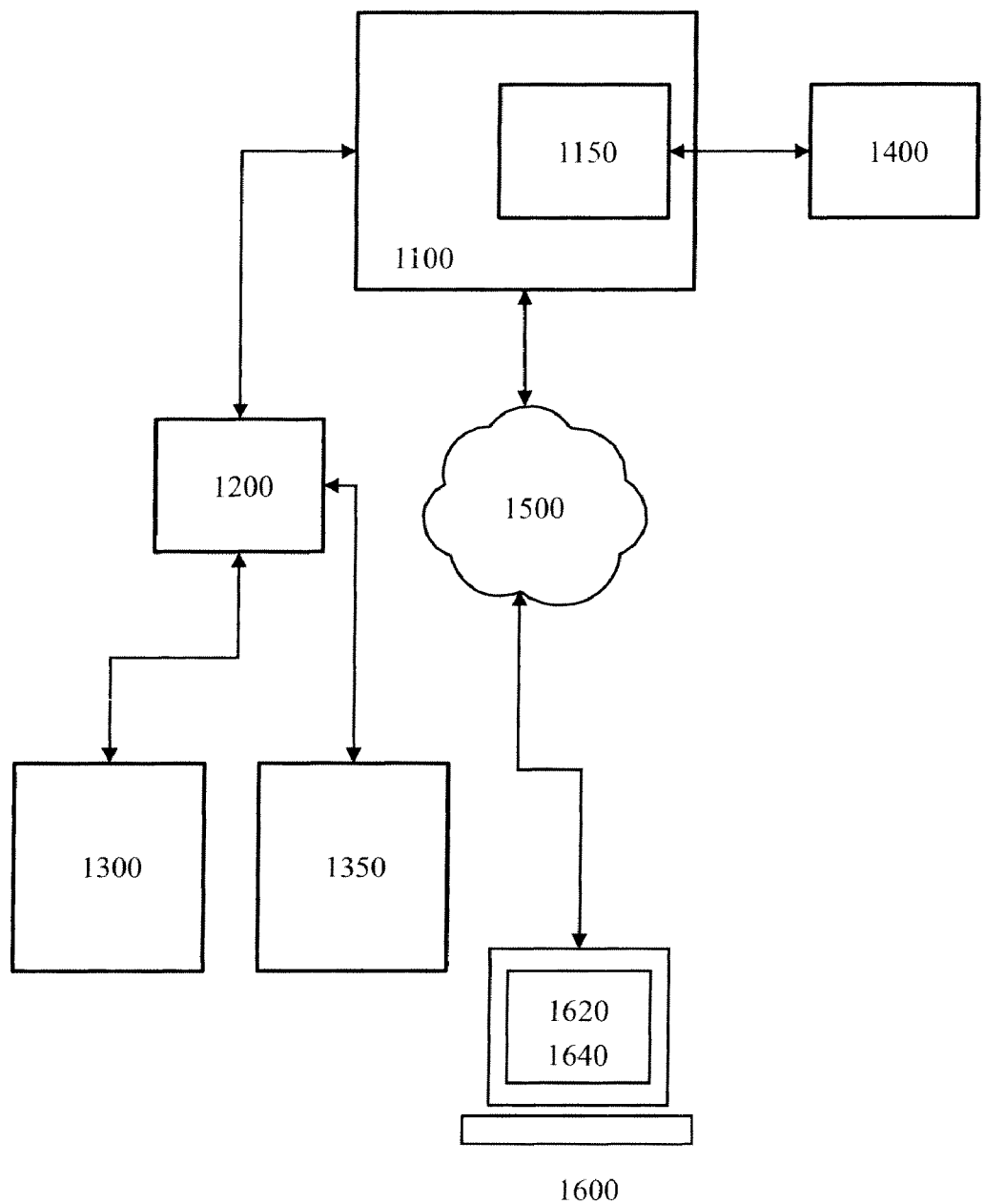
FIG. 1 is a block diagram of an exemplary embodiment of a system 1000.

Certain exemplary embodiments can provide a system, which can comprise a programmable logic controller (PLC). The system can comprise a serial communications port connected to the PLC. In certain exemplary embodiments, the system can comprise a controller adapted to enable a customer application program to access and control the serial communications port.

Certain exemplary embodiments can provide an ability to access and control a Universal Asynchronous Receiver/Transmitter (UARTs) in order to permit creation of custom communication protocols through the customer's Programmable Logic Controller (PLC) application program.

Freeport can provide the ability for the customer application program to access and control a serial communications port connected to a S7+ CPU. The operation of the communications port can be controlled by the customer application program through the use of specialized "System Functions" provided as a standard part of the PLC operating system, such as that of the S7-200 product line.

However, certain exemplary embodiments of several new features for the S7+ CPU product family can simplify the customer's creation of Freeport applications via the following capabilities, which are further described herein:
- additional message "Start and End Condition" support to simplify support of custom protocols;
- simplifying parameterization by adding STEP 7+ configuration support and additional runtime "System Function" parameterization support; and/or
- additional support for accessing and setting RS-232 control signals for increased flexibility of control when interfacing to $3^{rd}$ party communication devices such as cell phones, modems, and radios.

In certain exemplary embodiments, one or more new capabilities can be added to the Point-to-Point Freeport solution, which can comprise:
- parameterization can be specified and/or provided from the Engineering Station's hardware configuration, which can simplify the customer task and/or reduce the amount of application software the customer can create;
- new configuration related "System Functions" can be provided that can permit dynamic parameterization from the user program, which can be referenced as PORT_CFG, SEND_CFG, and RCV_CFG. Such functions can assist customers that require dynamic configuration of their application. Configurations that can be specified at runtime are contained within the listed "System Functions";
- explicit parameterization and control of the UART's Request-To-Send and Data-Terminal-Ready signals for increased flexibility of control when interfacing to $3^{rd}$ party communication devices such as cell phones, modems, and/or radios;
- increased flexibility with the "Variable Characters" start and end conditions, which can permit the customer to specify multiple, different character sequences, that include don't-care characters, to satisfy a series of different start and/or end conditions. Such characters can be used with protocols that have different and dynamic sequences of start and/or end characters. The "Variable Characters" selections can simplify the customer task and/or reduce the amount of application software the customer creates; and/or
- a new flexible "n+Length Field+m" end condition, which can permit the customer to specify where the length information can be embedded within their protocol. After receiving the number of "Length Field+m" characters, the end condition can be satisfied.

Point-to-Point Communication Overview

In certain exemplary embodiments, Point-to-Point ("PtP") communication devices can abstract physical communications devices from the customer. This can be accomplished by providing standard "System Function" interfaces that work with messages rather than characters.

1.1 Overview

In certain exemplary embodiments, PtP communication can give an application program control of communications channels that can be a part of a PLC communication system. Communications channels can reside in the PLC, in a module of the PLC's local rack, and/or in a remote rack of modules. The concept where the application program controls the operation of a communications channel(s) can be referred to by the descriptive "Freeport".

In embodiments where the communications channel is part of the PLC, PtP communication can be implemented as a function of PLC firmware without affecting any other system components. However, if the communications channel can be in a communications port ("CP") and/or an annex module then it cannot be implemented in the PLC alone. The CP and/or annex module can provide the interface to the communications channel and the PLC can provide the application interface that enables access to the module. Both the PLC and the module can provide system services that allow transport of the user controls and messages adapted to facilitate this operation. In a similar manner, the configuration of a communications channel can be performed by the user application.

In certain exemplary embodiments, STEP 7+ hardware configuration can provide configuration and parameter assignment support (also potentially Smart Client Configuration) that improve the ease of use needed for creating custom protocols. Certain exemplary embodiments can provide explicit configuration support for port, transmit, and receive configuration related items. This can be similar to the PtP configuration classic STEP 7. In certain exemplary embodiments, PtP configuration might not be offered. Classic S7-200 customers can programmatically develop certain PtP applications.

1.1.1 Custom Versus Provided Protocols

In certain exemplary embodiments, the target communications channel can be in the CPU and the CPU can execute the user program. The target channel can be in a module that is remotely located with respect to the CPU. For such a case, the I/O communication system can provide a transport mechanism for the data/control associated with system function calls ("SFCs"), such as certain SFCs defined herein, infra.

The original concept of custom Freeport protocol development was to provide direct control over the UART; thereby, enabling the customer to implement the protocol of choice in the application program. This can be a powerful and flexible capability, but for many customers the task of implementing a communication protocol can be difficult. Consequently, support for certain protocols can be provided, such as:

Freeport protocol: a customer can implement the complete protocol in the user program;
Provided master protocol: a predefined master protocol can utilize user program interaction; and/or
Provided slave protocol: predefined slave protocol can utilize a relatively small amount of user program interaction.

1.1.2 Freeport Protocols

Freeport communication can be serial communication in a relatively basic form. Controls for the communication channels can be provided through SFCs which can allow channels to be configured and/or used to implement most character based protocols. For any given protocol, a minimum of two communication partners can be used. A protocol can be implemented as either a client (master) or a server (slave) in a single partner.

The following steps can be used for the implementation of the slave side of a protocol:
configure the port;
configure the receiver;
configure the transmitter;
receive a request; and/or
transmit the response.

The last two steps of this sequence can be repeated as long as communications is active.

The following steps can be used for the implementation of the master side of a protocol:
configure the port;
configure the transmitter;
configure the receiver;
transmit the request;
receive the response; etc.

The last two steps of this sequence can be repeated as long as communications is active.

In either of these two cases, the data on the wire at the receiver can be de-serialized and presented to the user program in the receive buffer. Likewise, the data in the transmit buffer can be serialized and put onto the wire by the transmitter. All aspects of the protocol can be generated for transmission and processed during reception in the user program, which can include timing, preambles, lengths, checksums, and/or ending characters, etc.

1.1.3 Provided Protocols

The user programming burden for supporting PtP communication can be greatly reduced when certain protocols are developed, tested, and provided by a supplier of programmable logic controller hardware, software, and/or firmware. For slave protocols, the port configuration SFC can be a function invoked by the user program.

For example, if the selected protocol was MODBUS RTU slave protocol and the physical interface was realized as an RS-232 connection, then the port configuration system function call ("SFC") can be utilized for operation of the port. Even though the MODBUS protocol includes an address field, in certain exemplary embodiments, the address can be ignored because the physical medium is a point to point connection using RS-232.

If on the other hand the electrical interface was realized as a RS-485 connection, certain exemplary embodiments can supply a station address to the protocol before communication begins.

The following steps can be utilized for the implementation of a slave side protocol:
configure the port; and/or
use the transmit SFC to set parameters.

However, provided master protocols can be more complex. The following steps can be used for the implementation of a master side protocol in certain exemplary embodiments:
configure the port;
perform protocol parameterization (this varies depending upon the protocol); and/or
perform the user program data exchange using transmit and receive SFCs.

For example, the USS protocol can control the start/stop and speed of a motor and update the status of the drive along with the actual speed of the motor for the drives that are active on the network. In addition it can be possible to read and write parameter values as requested by user commands.

1.1.3.1 Siemens Provided Protocols

The following are examples of "provided-protocols" that can be supported by certain exemplary embodiments:
Universal Serial Interface (USS) drive protocol;
Modbus RTU Master Protocol;

Modbus RTU Slave Protocol;
3964R Protocol;
RK512 Protocol; and/or
Printer Driver.

1.1.4 Operating Mode

PtP communication can be a user function. As a result, certain exemplary embodiments make PtP communications available when the PLC is in the RUN mode.

Whenever the CPU is transitioned to STOP mode, any active transmission or reception can be caused to immediately and/or automatically cease. Certain buffered requests can be discarded.

1.1.5 Diagnostics

Diagnostic functions can be restricted to functions inherent to basic hardware and/or firmware functions of the PLC and/or modules. PtP modules can support diagnostic detection and can utilize Diagnostic Navigation Node (DNN) facilities to report errors.

In certain exemplary embodiments, PtP protocol specific diagnostics might not be provided within the scope of the PLC system. Certain protocol specific diagnostics can be detected and handled by the user application.

1.1.6 Memory Limits

Certain communication processor (CP) devices can offer a minimum of 16K bytes of memory that can be used to buffer both transmitted and received messages. The maximum size of a single transmitted message can be, for example, any value such as less than 1K, 2K, 4K, 8K, 18K, 28K, 99K, and/or 128K, etc.

1.2 Static and Dynamic Configuration
1.2.1 Static Configuration

In certain exemplary embodiments, PtP parameters can be accessible as "Properties" from Hardware Configuration and can be associated with PtP capable modules. Once the module is selected, the properties can become visible. Most PtP properties can be accessible as configuration related items and can be downloadable to the CPUs.

Once downloaded, these parameters can become the default configuration for the module. Configuration from the customer application program might not be specifically required.

In certain exemplary embodiments, these configuration items can be permanently stored in the CPU. Power-up or stop-to-run transitions can result in the last update of these parameters being restored.

1.2.2 Dynamic Configuration

In addition to static configuration, customers can dynamically configure PtP parameters from their application program. Dynamic configuration support can allow devices that do not support programming such as HMI or DCS systems to interact with the customer application in order to affect desired configurations. For example, customers of OEM manufacturers can configure baud rate and parity for devices that are interconnected to the OEM machine. In certain exemplary embodiments, parameters that are dynamically configured might not be permanently stored.

1.3 Connection and Coordinated Based Operations

Certain S7-400 CPUs (CP441-1 and CP441-2) can provide support for connection and coordinated send and receive operations between two communication partners. Connections can be specified through PtP network configuration performed through NetPro. This configuration can result in a connection identifier that can be used with the send and receive instruction parameters Coordinated operations can be accomplished using the R_ID parameter of specific send and receive instructions. This parameter can be used to specify which specific send and receive instructions belong together, i.e. a specific instruction instance or execution instance of the receive instruction can be paired with a specific instruction instance or execution instance of the send instruction.

Support for "GET/PUT", "USEND/URCV", or "BSEND/BRCV" operations can be a subset between the S7plus CPUs. Certain exemplary embodiments can support connection-based PtP operations.

S7-200+ can support legacy read and write ("Get" and "Put") SPS7 services as a server only. Certain exemplary embodiments can be supported through the DP/T protocol. Certain exemplary embodiments might not support customer accessible "Get" and "Put" operations.

1.3.1 Parameterization Precedence

Parameterization of features, functions, and/or modules can originate from many different sources. Table I identifies a set of exemplary different phases of parameterization and which phase has precedent, i.e. which value will the AS use during its execution if more than one value exists. Certain exemplary PtP applications might utilize initial and temporary value types shown in TABLE I.

TABLE I

| | Project Phase | Value Type | Description |
|---|---|---|---|
| 1 (Highest) | Operation Phase P3 | Temporary Value | Parameter values dynamically created typically through the user application program. Values might not be persistently stored in the PLC (AS). |
| 2 | Adaptation Phase P2 | Real Value | Parameter values dynamically created outside of the AS system. These can be created and/or accessed through provided communication services. Values can be persistently stored in the AS. |
| 3 | Project Phase P1 | Initial Value | Parameter values can be configured by the customer primarily through hardware configuration and/or downloaded from the engineering system (ES). Values can be persistently stored in the AS. |
| 4 | System Definition | Default Value | Initial pre-defined (hard-coded) default parameter values can be generated automatically by the ES when not specified by the customer and/or downloaded from the ES. Values can be persistently stored in the AS. |

1.4 User Program Overview

The system functions illustrated in TABLE II can be provided for customer application programs. The functions listed in TABLE II can be implemented via SFCs and/or SFBs.

1.4.1 Freeport Protocol

TABLE II

| | Type | Name | Description |
|---|---|---|---|
| 1 | SFC | PORT_CFG | Dynamically configures the port parameters |
| 2 | SFC | SEND_CFG | Dynamically configures the send parameters |
| 3 | SFC | RCV_CFG | Dynamically configures the receive parameters |
| 4 | SFC | SEND_PTP | Initiates the sending of a message to a communication partner |
| 5 | SFC | RCV_PTP | Initiates the reception of a message from a communication partner |

TABLE II-continued

| Type | Name | Description |
|---|---|---|
| 6 SFC | RCV_RST | Reset the receive buffer |
| 7 SFC | SGN_GET | Get the RS 232C secondary signals |
| 8 SFC | SGN_SET | Set the RS 232C secondary signals |

2 Freeport Protocol 2.1 Parameter Assignments

In certain exemplary embodiments, the parameters can be configurable for Freeport utilizing devices. A subset of these parameters can be dynamically configurable as attributes during runtime. Specified defaults can be provided as recommendations for accompanying ES configuration. However, default recommendations can be different depending upon particular protocols.

2.1.1 Port Parameters

Basic parameters can control how a particular communication channel can be managed. Certain exemplary parameters can select between Freeport and Provided protocols. Parameters in this category can be dynamically set using the "PORT_CFG" function.

TABLE III

Port Parameters

| Parameter | Description |
|---|---|
| Port | This parameter can specify the communication port that is to be configured. The port can be specified using the module's logical address. |
| Protocol | This parameter can specify how the communication channel is to be used, i.e. this parameter selects whether the system firmware or the user program controls the communication channel. Protocol selections can comprise the possibility for Freeport or Provided protocols. |
| Baud Rate | This parameter can specify the baud rate of the port. Particular PtP devices may implement a subset of the following selections: .3K, .6K, 1.2K, 2.4K, 4.8K, 9.6K, 19.2K, 38.4K, 57.6K, 76.8K, and/or 115.2K. A value of 9.6K baud can be the default. |
| Data Bits | This parameter can specify the number of data bits, such as 8 bits per character, which can be the default value, and/or 7 bits per character. |

TABLE IV

Port Parameters (Continued)

| Parameter | Description |
|---|---|
| Stop Bits | This parameter can specify the number of stop bits. The number of stop bits can be 1 stop bit, which can be the default value, and/or 2 stop bits.<br>* The S7-300 and S7-400 PtP CPs might not support stop bits of 1.5 |
| Parity | This parameter specifies the parity of the port. The parity can be No Parity, which can be the default parity value, even Parity, odd Parity, mark, and/or space.<br>In Freeport protocol with parity enabled, any receive message can be immediately terminated when a parity error is detected. |
| Flow Control | This parameter enables or disables flow control. If enabled, the type of flow control can be selected. This parameter can have a value of "none", which can be the default value, Hardware Flow Control, and/or XON/XOFF |
| XON Char | The actual XON character. DC1 (default) |
| XOFF Char | The actual XOFF character. DC3 (default) |

TABLE IV-continued

Port Parameters (Continued)

| Parameter | Description |
|---|---|
| Wait Time | Amount of time to wait for XON after receiving XOFF or CTS after enabling RTS. The default value of this parameter can be approximately 2 seconds. |

2.1.2 Send Configuration Parameters

Parameters can be dynamically set using the "SEND_CFG" function.

TABLE V

Basic Parameters

| Parameter | Description |
|---|---|
| RTS On Delay | This parameter can specify the amount of time to wait after activating RTS before transmission can be initiated. For example, a range from 0 to 64K in 10 ms can be supported. When selected, the default can be 0. |
| RTS Off Delay | This parameter can specify the amount of time to wait before de-activating RTS once transmission has been completed. A range from 0 to 64K in 10 ms can be supported. When selected, the default can be 0. |
| Send Complete Event | This parameter can select whether to enable or disable interrupts once a transmission is complete. The parameter can indicate not to generate a transmit complete event, which can be the default value and/or can generate a transmit complete event If this parameter is disabled, no send interrupts can be generated and the status of any operations can be polled. |
| Send Complete OB | This parameter can specify the object (OB) to be executed once the transmit complete event occurs. |

Parameters dynamically set using the "SEND_CFG" function can also comprise:

1) Start a message with a BREAK (user can specify the duration of a BREAK in bit times; a BREAK is defined to be a spacing line condition for more than a character time—typically 16 bit times); and/or
2) Idle line after BREAK (user can specify the duration of the idle line; an idle line is specified to be a marking line condition).

2.1.3 Start Reception Configuration Parameters

Parameters can specify conditions necessary to begin receiving a message. Parameters in this category can be dynamically set using the "RCV_CFG" function. In certain exemplary embodiments, a customer can select any set of combinations of start conditions. For example, both an Idle Line and Start Character or a Line Break and Start Character can be concurrently selected. Certain exemplary embodiments can have limited restrictions regarding the concurrent selection of different start conditions.

TABLE VI

Start Condition Parameters for Receiving Messages

| Parameter | Description |
|---|---|
| Start Char | Start receiving when a specified character is received (character can be configured). When selected, the default can be "STX". |
| Any Char | Start receiving on any character. When enabled, the default can indicate a start condition. |
| Line Break | Start receiving when the receive line state is enabled longer than the total character time. |
| Idle Line | Start receiving when the line becomes idle for a specified period of time (time can be configured). A range from 0 to 64K ms can be supported. When selected, the default |

TABLE VI-continued

Start Condition Parameters for Receiving Messages

| Parameter | Description |
|---|---|
| | can be approximately 4 milliseconds. The idle line time can be specified in bit times (such as from 0 to 2500 bit times). |
| Variable Chars (STRSEQx) | Start receiving based upon multiple (n) different start configurations with multiple different start sequences. In certain exemplary embodiments, specified character positions can be ignored.<br>When configuring each sequences and characters, customers can specify one or more of the following characteristics:<br>sequences can be enabled or disabled, e.g., the number of active sequences can be varied:<br>each character within each sequence can be specified whether it is used in the comparison or ignored. The characters can be specified in the STRSEQx parameters. Whether characters are to be used or ignored can be specified in the STRSEQxCTL parameters; and/or if a character selected for comparison, a value can be specified. |

| | First Char | First Char + 1 | First Char + 2 | First Char + 3 | First Char + 4 |
|---|---|---|---|---|---|
| #1 | 0x68 | Xx | xx | 0x68 | xx |
| #2 | xx | 0x67 | xx | xx | 0x67 |
| #3 | 0x66 | Xx | xx | xx | 0x66 |
| #4 | xx | Xx | 0x65 | xx | xx |
| ... | | | | | |

Certain exemplary embodiments might not have defaults.

2.1.4 End Reception Configuration Parameters

Parameters can specify conditions to complete reception of a message. In certain exemplary embodiments, a customer can select combinations of end conditions. Certain exemplary embodiments can utilize relatively few restrictions regarding the concurrent selection of different end conditions. In certain exemplary embodiments, end conditions associated with characters and character sequences can be incorporated into "Variable Characters" configuration. Parameters in this category can be dynamically set using the "RCV_CFG" function.

TABLE VII

End Condition Parameters for Receiving Messages

| Parameter | Description |
|---|---|
| Receive Complete Event | This parameter selects whether to enable or disable interrupts once a reception is complete. The parameter value can indicate to not generate a receive complete event, which can be the default value, and/or the value can cause a receive complete event to be generated. If this parameter is disabled, certain exemplary embodiments might not generate receive interrupts and the status of operations can be polled. |
| Receive Complete OB | This parameter can specify the OB to be executed once the "receive complete" event occurs. |
| Response Timeout (RCVTIME) | End receiving when the amount of time to wait for the start of a message condition has expired. When selected, the default time can be approximately 200 milliseconds (ms). A range from approximately 0 to approximately 64K ms can be supported. |
| Message Timeout (MSGTIME) | End receiving when the amount of time to wait for the end of a message condition has expired. This can be like the no response timeout except that the start of message condition has been satisfied.<br>The default time can be approximately 200 ms.<br>A range from approximately 0 to approximately 64K ms can be supported. |

TABLE VII-continued

End Condition Parameters for Receiving Messages

| Parameter | Description |
|---|---|
| Inter-Char Gap (CHARGAP) | End receiving when the maximum time between consecutive characters of a message has been exceeded. |

TABLE VIII

End Condition Parameters for Receiving Messages (Continued)

| Parameter | Description |
|---|---|
| Maximum Length (MAXLEN) | End receiving when a maximum number of characters have been received. In certain exemplary embodiments, this end condition can be combined with above described timeout end conditions.<br>When a timeout end condition occurs, any valid received characters can be provided even if the maximum length has not been reached.<br>This allows support for varying length protocols such as when the maximum length is known. When selected, the default can be 0 bytes. A range from approximately 0 to approximately 4K can be supported. |
| n + Length Size + Length m | End receiving can be based upon a calculation that uses several parameters to determine the formatting and size of a message. "n" can specify the position (number of characters into the message) of the length field within the message. "Length Size" can specify the size of the length parameter (one byte, two bytes, four bytes, etc). The value of this parameter can be interpreted as unsigned.<br>"Length m" can specify the number of ending characters that are not included within the length of the message. As an example, consider the following message format that consists of a start character, an address character, a one-byte length field, message data, checksum characters, and an end character.<br>The entries identified with "Len" correspond with the "n" parameter. The value of "n" would be 2 specifying that the length byte is positioned 3 bytes into the message. The value of "Length Size" would be 1 specifying that the value for the length of the message is contained in 1 byte. The checksum and end char fields correspond with the "Length m" parameter. The value of "Length m" would be 3 specifying the number of bytes of the 3 end fields. |

| Start Char | Address | Len (n) | Message | Checksum (Length m) | End Char |
|---|---|---|---|---|---|
| (0) | (1) | (2) | ... (x) | x + 1  x + 2 | x + 3 |
| xx | Xx | Xx | xx xx xx | xx | xx |

When selected, the defaults are 0.

TABLE IX

End Condition Parameters for Receiving Messages (Continued)

| Parameter | Description |
|---|---|
| Variable Chars (ENDSEQx) | End receiving can be based upon possibly multiple different end configurations with multiple different sequences. Any one of these configuration sequences can satisfy an end condition.<br>In certain exemplary embodiments, configuration of end conditions can satisfy legacy support for end conditions of specific characters including S7-300 support of BCC characters. When configuring each sequence and characters, customers can specify one or more of the following characteristics:<br>sequences can be enabled or disabled, i.e. the number of active sequences can be varied; |

TABLE IX-continued

End Condition Parameters for Receiving Messages (Continued)

| Parameter | Description |
|---|---|
| | each character within each sequence can be specified whether it is used in the comparison or ignored. Characters can be specified in the ENDSEQx parameters. Whether characters are to be used or ignored can be specified in the ENDSEQxCTL parameters; and/or If a character is selected for comparison, a value can be specified |

| | | Last Char − 4 | Last Char − 3 | Last Char − 2 | Last Char − 1 | Last Char |
|---|---|---|---|---|---|---|
| | #1 | 0x68 | xx | xx | 0x68 | xx |
| | #2 | Xx | 0x67 | xx | xx | 0x67 |
| | #3 | 0x66 | xx | xx | xx | 0x66 |
| | #4 | Xx | xx | 0x65 | xx | xx |

Certain exemplary embodiments might not use defaults.

2.2 Flow Control

Flow control can be accomplished by control lines in a data communication interface (i.e. hardware flow control) and/or by reserving control characters (i.e. software flow control) to signal start and stop constraints. PtP devices can support both methods as described below. Certain exemplary PtP devices might not disable flow control to the initiator of transmission. PtP devices can be adapted to maintain sufficient resources in order to be able to process a complete message.

2.2.1 Hardware Flow Control

Hardware flow control can work through cooperative use of Request-to-Send and Clear-to-Send signals. Upon receiving a send request, the initiator can asserts an RTS line and/or wait for CTS to be asserted during the time specified by "Wait Time". Once the CTS line is active, the initiator can begin sending data.

The initiator can monitor CTS throughout the transmission. If the responder disables CTS, transmission can immediately stop. The initiator can once again wait the amount of time specified by "Wait Time" for CTS to be re-asserted. Once re-asserted, transmission can resume.

If the wait time expires before CTS is re-asserted, the current transmission can be aborted and the customer application appropriately notified.

In certain exemplary embodiments, the use of other miscellaneous signals such as DTR and DSR can be subsets, which can be defined as optional signals that may or may not be supported across the different CPs.

2.2.2 Hardware Handshaking and Flow Control

As an alternative to standard hardware flow control, signal handshaking can be supported. In certain exemplary embodiments, the DTE can assert RTS by default, which can permit a modem to transmit whenever it desires.

When either a configured number of message frames or configured number of characters, the DTE can disable the RTS line in order to ensure that the receive buffer does not overflow.

If the transmitting communication device continues to send data to the extent that the receive buffer overflows, the received message can be discarded and an appropriate error message can be generated.

2.2.3 Software Flow Control

Software flow control works by sending specific characters for controlling and limiting transmissions. Two bytes have been predefined in the ASCII character set to be used with software flow control. These bytes can be referred to as XOFF and XON characters.

The initiator of a transmission can actively monitor it's receive line for a XOFF character. Once an XOFF is received, transmission can immediately stop. Once a corresponding XON character is received, transmission can resume.

The initiator can wait the amount of time specified by "Wait Time" for a XON to be sent after a XOFF is received. If the wait time expires before XON is re-asserted, the current transmission can be aborted and the customer application appropriately notified.

Software flow control can utilize a full-duplex communication interface since control characters can be sent from the responder during a transmission from the initiator. Similar flow control behaviors apply as described in the "Hardware Handshaking" section, supra.

2.3 User Program Implementation

Certain exemplary embodiments can provide function definitions that include the function's type, name, family, and number. In addition, each operand can be defined. Each definition can include the operand's name, data type, and interface type.

2.3.1 User Program Integration

Freeport transmissions and receptions can be initiated from the customer application program by the SEND_PTP and RCV_PTP functions. However, these functions might not transmit or receive messages directly. They can work cooperatively between the CPU and the PtP CP modules or Annex modules.

These functions can be asynchronous functions that transmit and receive entire messages to and from the respective cards. Each module can be responsible for directly transmitting and receiving messages.

In order for the customer's application to determine the status of transmissions and receptions and provide necessary application control, either polling or event driven architectures can be employed.

These architectures can be further described in the following sections. Examples can be used where the PLC can be the initiator of the transmission and the connected device can be the responder.

2.3.1.1 Polling Architecture

A polling implementation can require that the customer's application program manually check the status of a transmission or reception. For Freeport protocols that transmit and receive messages using this method, handling can be accomplished with the following.

First, a transmission can be initiated using the SEND_PTP function. This function can provide the message to be transmitted to the module and the transmission can be initiated.

Next, the user application can determine when the transmission completes and if it has completed correctly. The application can repeatedly call the SEND_PTP function in order to monitor the status of the transmission. In certain exemplary embodiments, a rising edge on the REQ input can initiate the transmission of the specified message. All other calls to this function can return the current status.

Once the transmission completes, the user application program can perform any activities to prepare for the anticipated response to the transmission. The application can then initiate a RCV_PTP function. This function can repeatedly check the status of the expected response to the completed transmission. Once the reception is obtained, the status can be set appropriately and the response can be transferred to the buffer specified within the application program. For a polling architecture, all these activities can be performed in the main program thread.

2.3.1.2 Interrupt Architecture

An interrupt implementation can require the PLC to generate interrupts upon specific events. This is a type of "callback" architecture where customer specified communication interrupt OBs can be executed each time a transmission or reception event occurs. For Freeport protocols that transmit and receive messages using interrupts, handling can be accomplished with the following.

First, an OB can be specified to handle interrupts that can be generated by each transmit event. A transmission can be initiated using the SEND_PTP function. This function can provide the message to be transmitted to the card and the transmission can be initiated.

Next, the PLC operating system can generate a communication interrupt once the transmission completes. Execution of the main thread can be preempted and can be transferred to a previously specified interrupt OB. This OB can be responsible for performing any activities that are necessary to prepare for the anticipated response to the transmission such as specifying the interrupt OB that can be responsible for handling the receive complete event. In certain exemplary embodiments, when the transmit buffer of the CP has been emptied, the transmit interrupt can be generated, which can indicate whether the transmitted message encountered an error.

Next, the PLC operating system can generate a process interrupt once the corresponding receive message completes. Execution of the main thread can be preempted and can be transferred to a previously specified receive interrupt OB. This OB can be responsible for executing the RCV_PTP function to actually transfer the received message from the CP card or Annex card to the specified memory area. The RCV_PTP function can be executed once within the receive interrupt OB.

In certain exemplary embodiments, particular customer PtP implementations can implement protocols that exceed the maximum size of transmitted or received messages. In these situations, the customer application can be responsible for ensuring the messages have been handled correctly. For example, the customer's application can ensure that the complete message has been received before operating upon the message.

2.3.1.3 PtP Interrupts

As specified above, enabling of PtP interrupts can be specified through transmit and receive parameter assignments or through dynamic configuration from the user program by the attaching of particular events. Once interrupts are enabled, all normal or abnormal completions of any transmission or reception can be indicated through the generation of a process interrupt. PtP interrupts can be categorized within the "Process Control" event class.

Once a transmission or reception has completed, corresponding PtP interrupts can be generated within a maximum of 1 millisecond. Disregarding the potential of interrupt latency, in certain exemplary embodiments the customer's application program can be notified within this specified time.

2.3.1.4 Simultaneous Sending and Receiving

User applications can perform simultaneous executions of SEND_PTP and RCV_PTP functions. Certain exemplary embodiments might not have limitations with concurrent execution of SEND_PTP and RCV_PTP functions (as experienced within S7-200 classic today). If a transmission is in progress, the RCV_PTP function can be executed to return the current status of the receive buffer or the actual receive data.

From the PtP CP perspective, messages that are to be transmitted and messages that have been received can be buffered in CP memory. Each time the application program requests a message to be transmitted, the CP can store this message up to the limit of its buffer. In certain exemplary embodiments, the number of simultaneous transmission requests can be limited to a single message. This means that any single transmission can be complete before the second transmission begins. Buffering can be applicable for received messages. These can be stored within the CP and can be provided to the application program when requested by execution of RCV_PTP functions.

2.3.1.5 OB Start Information

A small set of start information can be supported. This information can be useful to help identify an event when more than one event is attached to a single OB:

| | |
|---|---|
| event_count: | INT; |
| event: | DWORD; |
| laddr: | WORD; |

2.3.2 Error Handling

2.3.2.1 System Functions

Each System Function can provide three outputs that can be specifically associated with determining completion status. These outputs can be described as follows:

TABLE X

| Parameter | Type | Data Type | Default | Description |
|---|---|---|---|---|
| DONE/NDR | Out | Boolean | FALSE | Done is used for transmit; when TRUE shows for one scan that the last request was completed without errors. NDR (new data ready) is used for receive. when TRUE shows for one scan that new data has been received. |
| ERROR | Out | Boolean | FALSE | When TRUE shows that the last request was completed with errors. Also, when this output is TRUE, the STATUS output will contain related error codes. |
| STATUS | Out | Word | 0 | The STATUS word is divided into 2 distinct sections, error class and error number. Status values returned during polling, such as SEND_PTP and RCV_PTP, are only valid during the duration of execution of the function. |

2.3.2.2 Error Classes and Numbers

Different error classes can be used to represent different categories of errors. For example, to distinguish between configuration errors and transmission errors, different error classes can be used.

Also, different error classes can be used to distinguish errors within specific provided protocols. Each provided protocol can report errors in distinct error classes.

2.3.2.2 Common Classes and Errors

TABLE XI

| Error Classes | Description |
|---|---|
| Configuration | Used to define common configuration errors. |
| Transmission | Used to define common transmission errors. |
| Reception | Used to define common reception errors. |

TABLE XII

Configuration Errors

| Event ID | Description |
|---|---|
| Buffer Error | The buffer specified by the user application does not exist. |
| Port Number | The specified port number does not exist. |

TABLE XIII

Transmission Errors

| Event ID | Description |
|---|---|
| Buffer Limit | The total available transmit buffer of the CP has been exceeded. |
| Length Limit | The size of the requested transmit message exceeds the maximum allowed size. |
| Transmit Canceled | Pending transmission requests have been discarded. |
| Flow Control Expired | The receiver issued a flow control request to suspend an active transmission and never re-enabled the transmission during the specified wait time. |
| Protocol Selection | The selection specified for a provided protocol is not supported. |

TABLE XIV

Reception Errors

| Event ID | Description |
|---|---|
| Parity | This error includes parity, framing, and overrun errors. |
| Buffer Limit | The total available receive buffer of the CP has been exceeded. |
| Parameters | This occurs when data is received no start or end conditions have been defined or when the start data is contains inconsistency. |
| Length Limit | The size of the received message exceeds the maximum allowed size. |
| Receive Canceled | Previously received messages have been discarded. |
| Receive | No message was received during the specified receive period. |
| Timeout | The error can occur when using the "response timeout" end condition. |

2.3.3 System Functions
2.3.3.1 Port Configuration PORT_CFG

This is a method that can be responsible for the dynamic configuration of the operating parameters for the specified serial port. This method can be identified by the following information, which can be implemented as an SFC or an SFB.

TABLE XV

| Type | Name | Family | Number | Expanded Name |
|---|---|---|---|---|
| SFC or SFB | PORT_CFG | Freeport | | Port Configuration |

The prototype for this method can be defined as follows:

TABLE XVI

| Type | Name | Data Type | Description |
|---|---|---|---|
| Input | PORT | UINT | Please refer to "Port Parameters" section for a description of these parameters. |
| Input | PROTOCOL | UINT | |
| Input | BAUD | UINT | |
| Input | PARITY | UINT | |

TABLE XVI-continued

| Type | Name | Data Type | Description |
|---|---|---|---|
| Input | DATABITS | UINT | |
| Input | STOPBITS | UINT | |
| Input | FLOWCTRL | UINT | |
| Input | XONCHAR | UINT | These will only be applicable if the selected flow control option is enabled as using XON/XOFF. |
| Input | XOFFCHAR | UINT | |
| Input | XWAITIME | UINT | |
| Output | DONE | BOOL | Please refer to "Error Handling" section for a description of these parameters. |
| Output | ERROR | BOOL | |
| Output | STATUS | WORD | |

2.3.3.2 Send Configuration SEND_CFG

This is a method that is responsible for the dynamic configuration of the operating parameters for an anticipated serial transmission. This method can be identified by the following information. In certain exemplary embodiments, any pending messages awaiting transmission within a CP can be discarded once a send configuration function is executed. The method can be implemented as an SFC or SFB.

TABLE XVII

| Type | Name | Family | Number | Expanded Name |
|---|---|---|---|---|
| SFC or SFB | SEND_CFG | Freeport | 0 | Send Configuration |

The prototype for this method can be defined in Table XVIII.

TABLE XVIII

| Type | Name | Data Type | Description |
|---|---|---|---|
| Input | REQ | BOOL | Activates the requested operation on the rising edge of this input. |
| Input | PORT | UINT | Please refer to "Port Parameter" section for a description of these parameters. |
| Input | RTSONDLY | UINT | Please refer to "Send Configuration Parameters" section for a description of these parameters. |
| Input | RTSOFFDLY | UINT | |
| Input | XMTEVENT | BOOL | |
| Input | XMTOB | INT | |
| Input | BREAK | UINT | |
| Input | IDLELINE | UINT | |
| Output | DONE | BOOL | Please refer to "Error Handling" section for a description of these parameters. |
| Output | ERROR | BOOL | |
| Output | STATUS | WORD | |

2.3.3.3 Receive Configuration RCV_CFG

This is a method that is responsible for the dynamic configuration of the operating parameters for an anticipated serial reception. This method is identified by the following information. In certain exemplary embodiments, any pending messages that have been received within a CP can be discarded once a receive configuration function is executed. The prototype for this method is defined in Table XX.

TABLE XIX

| Type | Name | Family | Number | Expanded Name |
|---|---|---|---|---|
| SFC or SFB | RCV_CFG | Freeport | 0 | Receive configuration |

TABLE XX

| Type | Name | Data Type | Description |
| --- | --- | --- | --- |
| Input | REQ | BOOL | Activates the requested operation on the rising edge of this input. |
| Input | PORT | UINT | Please refer to "Port Parameters" section for a description of these parameters. |
| Input | CONDITIONS | UDT | Please refer to the structure below for the definition of these parameters. |
| Output | DONE | BOOL | Please refer to "Error Handling" section for a description of these parameters. |
| Output | ERROR | BOOL | |
| Output | STATUS | WORD | |

The following table lists each parameter individually for the User Defined Type "Conditions". These are parameters needed to specify start and end conditions.

TABLE XXI

| Type | Data Type | Name | Description |
| --- | --- | --- | --- |
| Input | UInt | STARTCOND | Please refer to "Start Reception Configuration Parameters" section for a description of these parameters. |
| Input | Byte and/or UInt | IDLETIME | |
| Input | BYTE | STARTCHAR | |
| Input | Byte | STRSEQ1CTL | |
| Input | Char[5] | STRSEQ1 | |
| Input | Byte | STRSEQ2CTL | |
| Input | Char[5] | STRSEQ2 | |
| Input | Byte | STRSEQ3CTL | |
| Input | Char[5] | STRSEQ3 | |
| Input | Byte | STRSEQ4CTL | |
| Input | Char[5] | STRSEQ4 | |
| Input | UInt | ENDCOND | Please refer to "End Reception Configuration Parameters" section for a description of these parameters. |
| Input | UInt | MAXLEN | |
| Input | Byte or UInt | N | |
| Input | Byte or UInt | LENGTHSIZE | |
| Input | Byte or UInt | LENGTHM | |
| Input | UInt | RCVTIME | |
| Input | UInt | MSGTIME | |
| Input | UInt | CHARGAP | |
| Input | BOOL | RCVEVENT | |
| Input | Int | RCVOB | |
| Input | Byte | ENDSEQ1CTL | |
| Input | Char[5] | ENDSEQ1 | |
| Input | Byte | ENDSEQ2CTL | |
| Input | Char[5] | ENDSEQ2 | |
| Input | Byte | ENDSEQ3CTL | |
| Input | Char[5] | ENDSEQ3 | |
| Input | Byte | ENDSEQ4CTL | |
| Input | Char[5] | ENDSEQ4 | |

The following set of pseudo-code lists the same parameters as specified above in the form of a corresponding actual data structure for an exemplary embodiment.

```
CONDITIONS:           STRUCT;
    START:            STRUCT;
        IDLETIME:     BYTE;
        SEQ:  ARRAY [1..4] OF STRUCT
            CTL:  BYTE;
            STR:  ARRAY [1..5] OF CHAR;
        END_STRUCT;
    END_STRUCT;
    END: STRUCT;
        MAXLEN:       UINT;
        N:            BYTE;
        LENGTHSIZE:   BYTE;
        LENGTHM:      BYTE;
        RCVTIME:      UINT;
        MSGTIME:      UINT;
        CHARGAP:      UINT;
        RCVEVENT:     BOOL;
        RCVOB:        UINT;
        SEQ:  ARRAY [1..4] OF STRUCT;
            CTL:  BYTE;
            STR:  ARRAY [1..5] OF CHAR;
        END_STRUCT;
    END_STRUCT;
END_STRUCT;
```

The following set of pseudo-code lists the same parameters as specified above in the form of a corresponding actual data structure for an exemplary embodiment.

```
CONDITIONS:              STRUCT;
    START:               STRUCT;
        STARTCOND:       UINT;
        IDLETIME:        UINT;
        STARTCHAR:       BYTE;
        SEQ:  ARRAY [1..4] OF STRUCT
            CTL:  BYTE;
            STR:  ARRAY [1..5] OF CHAR;
        END_STRUCT;
    END_STRUCT;
    END: STRUCT;
        ENDCOND:         UINT;
        MAXLEN:          UINT;
        N:               UINT;
        LENGTHSIZE:      UINT;
        LENGTHM:         UINT;
        RCVTIME:         UINT;
        MSGTIME:         UINT;
        CHARGAP:         UINT;
        SEQ:  ARRAY [1..1] OF STRUCT;
            CTL:  BYTE;
            STR:  ARRAY [1..5] OF CHAR;
        END_STRUCT;
    END_STRUCT;
END_STRUCT;
```

2.3.3.4 Send SEND_PTP

Certain exemplary embodiments provide a method that can be responsible for the transmission of the actual data. The send command can initiate the transmission of a buffer. This method can be identified by the following information. In certain exemplary embodiments, the "SEND_PTP" function does not actually perform a transmission of the contents of the specified buffer. The buffer contents can be transferred to the PtP device. This device can perform the actual transmission.

TABLE XXII

| Type | Name | Family | Number | Expanded Name |
| --- | --- | --- | --- | --- |
| SFC or SFB | SEND_PTP | Freeport | 0 | Send data |

The prototype for this method can be defined as is TABLE XXIII.

TABLE XXIII

| Type | Name | Data Type | Description |
| --- | --- | --- | --- |
| Input | REQ | BOOL | Activates the requested transmission on the rising edge of this transmission enable input. Transfers to contents of the buffer to the PtP CP. The application |

TABLE XXIII-continued

| Type | Name | Data Type | Description |
|---|---|---|---|
| | | | program can be responsible for the state of the REQ history. This means that a separate rising edge instruction can be used in conjunction with the REQ input. |
| Input | PORT | UINT | This parameter specifies the communication port where the transmission can occur. The port can be specified using the module's logical address. |
| Input | BUFFER | ANY | This parameter points to the starting location of the transmit buffer. Please note that for provided protocols, this input can be used to send both configuration and protocol data to the PtP device. The CTRL input can be used to specify this selection. |
| Input | LENGTH | UINT | Buffer length |
| Input | CTRL | BOOL | This parameter selects the buffer as normal Freeport or specific Siemens provided protocols that can be implemented within the attached CP or Annex modules. |
| Output | DONE | BOOL | Please refer to "Error Handling" section for a description of these parameters. |
| Output | ERROR | BOOL | |
| Output | STATUS | WORD | |

2.3.3.5 Receive RCV_PTP

The receive command initiates the reception of a message. The receive command can be issued once for each message. Certain exemplary embodiments might not make available within the receive buffer until a message is completely received.

TABLE XXIV

| Type | Name | Family | Number | Expanded Name |
|---|---|---|---|---|
| SFC or SFB | RCV_PTP | Freeport | 0 | Receive data |

The prototype for this method can defined as follows:

TABLE XXV

| Type | Name | Data Type | Description |
|---|---|---|---|
| Input | EN_R | BOOL | Activates the requested reception on the rising edge of this enable input. Initiates transfer of a received message from the PtP CP to the specified buffer. When this input is false, prevents the (S)FB from acknowledging new data available from the PtP module. This is used to prevent overwriting of the DB with newly received messages. |
| Input | PORT | UINT | This parameter can specify the communication port where the transmission will occur. The port can be specified using the module's logical address. |
| Input | BUFFER | ANY | This parameter can point to the starting location of the receive buffer. |
| Output | NDR | BOOL | Please refer to "Error Handling" section for a description of these parameters. |
| Output | ERROR | BOOL | |
| Output | STATUS | WORD | |
| Output or In/Out | LENGTH | UINT | Buffer length; The input can be the maximum length of the user buffer. The corresponding output can be the actual returned length. |

2.3.3.6 Get RS-232 Signals SGN_GET

Certain exemplary embodiments provide a method that can be responsible for obtaining the current state for several of the RS-232 signals. This method is identified by the following information.

TABLE XXVI

| Type | Name | Family | Number | Expanded Name |
|---|---|---|---|---|
| SFC or SFB | SGN_GET | Freeport | | Get RS-232 signals |

The prototype for this method can be defined as follows:

TABLE XXVII

| Type | Name | Data Type | Description |
|---|---|---|---|
| Input | REQ | BOOL | Activates the requested set operation on the rising edge of this input. |
| Input | PORT | UINT | This parameter specifies the communication port that is to be configured. |
| Output | DTR | BOOL | Data terminal ready, module ready |
| Output | DSR | BOOL | Data set ready, communication partner ready |
| Output | RTS | BOOL | Request to send, module ready to send |
| Output | CTS | BOOL | Clear to send, communication partner can receive data from the module (response to RTS = ON of the module) |
| Output | DCD | BOOL | Data carrier detect, receive signal level |
| Output | RING | BOOL | Ring indicator, indication of incoming call |
| Output | NDR | BOOL | Please refer to the "Error Handling" section for a description of these parameters. |
| Output | ERROR | BOOL | |
| Output | STATUS | WORD | |

2.3.3.7 Set RS-232 Signals SGN_SET

Certain exemplary embodiments provide a method that can responsible for setting the state for two of the RS-232 output signal, which can be identified by the following information.

TABLE XXVIII

| Type | Name | Family | Number | Expanded Name |
|---|---|---|---|---|
| SFC or SFB | SGN_SET | Freeport | | Set RS-232 signals |

The prototype for this method can be defined as follows:

TABLE XXIX

| Type | Name | Data Type | Description |
|---|---|---|---|
| Input | REQ | BOOL | Activates the requested set operation on the rising edge of this input. |
| Input | PORT | UINT | This parameter specifies the communication port that is to be configured. |
| Input | SIGNAL | BYTE | Selects which signals to be set |
| Input | RTS | BOOL | Request to send, module ready to send |
| Input | DTR | BOOL | Data terminal ready, module ready |

TABLE XXIX-continued

| Type | Name | Data Type | Description |
|---|---|---|---|
| Input | DSR | BOOL | Data set ready (only applies to DCE type interfaces) |
| Output | DONE | BOOL | Please refer to the Section 0, "Error Handling" section for a description of these parameters. |
| Output | ERROR | BOOL | |
| Output | STATUS | WORD | |

2.3.3.8 Reset Receive Buffer RCV_RST

This method can be responsible for clearing the receive buffer.

TABLE XXX

| Type | Name | Family | Number | Expanded Name |
|---|---|---|---|---|
| SFC or SFB | RCV_RST | Freeport | | Reset Receive Buffer |

The prototype for this method is defined as follows:

TABLE XXXI

| Type | Name | Data Type | Description |
|---|---|---|---|
| Input | REQ | BOOL | Activates the requested reset operation on the rising edge of this input. |
| Input | PORT | UINT | This parameter specifies the communication port that is to be configured. |
| Input | REQ | BOOL | Activates the requested reset operation on the rising edge of this enabling input. |
| Output | DONE | BOOL | Please refer to "Error Handling" section for a description of these parameters. |
| Output | ERROR | BOOL | |
| Output | STATUS | WORD | |

APPENDIX A—RS-232 ELECTRICAL INTERFACE

Data Communications Equipment (DCE)

TABLE XXXII

| Signal Description | Type | Signal |
|---|---|---|
| RxD - Data received from an external device | Input | Required |
| TxD - Data transmitted to an external device | Output | Required |
| CTS - Clear to send | Input | Required |
| RTS - Request to send, often to activate a transmitter | Output | Required |
| DSR - Data set ready | Output | Optional |
| Signal Ground | N/A | Required |
| DCD - Data carrier ready | Output | Optional |
| Secondary received line signal detect | Output | Optional |
| Secondary request to send | Output | Optional |
| Secondary transmit | Input | Optional |
| Transmitter signal timing | Output | Optional |
| Secondary receive data | Output | Optional |
| Receiver signal timing | Output | Optional |
| Local loopback | Input | Optional |
| Secondary clear to send | Input | Optional |
| DTR - Data terminal ready | Input | Optional |
| Remote loopback | Input | Optional |
| Ring indicator | Output | Optional |
| Data signal rate selector | Input | Optional |
| Transmitter signal timing | Input | Optional |
| Test mode | Output | Optional |

Data Terminal Equipment (DTE)

TABLE XXXIII

| Signal Description | Type | Signal |
|---|---|---|
| TxD - Data transmitted to an external device | Output | Required |
| RxD - Data received from an external device | Input | Required |
| RTS - Request to send, often to activate a transmitter | Output | Required |
| CTS - Clear to send | Input | Required |
| DSR - Data set ready | Input | Optional |
| Signal Ground | N/A | Required |
| DCD - Data carrier ready | Input | Optional |
| Secondary received line signal detect | Input | Optional |
| Secondary clear to send | Input | Optional |
| Secondary transmit | Output | Optional |
| Transmitter signal timing | Input | Optional |
| Secondary receive data | Input | Optional |
| Receiver signal timing | Input | Optional |
| Local loopback | Output | Optional |
| Secondary request to send | Output | Optional |
| DTR - Data terminal ready | Output | Optional |
| Remote loopback | Output | Optional |
| Ring indicator | Input | Optional |
| Data signal rate selector | Output | Optional |
| Transmitter signal timing | Output | Optional |
| Test mode | Input | Optional |

APPENDIX B—RS-485 ELECTRICAL INTERFACE

TABLE XXXIV

| Signal Description | | Type | Signal |
|---|---|---|---|
| Common Ground | | N/A | Optional |
| TxD+/RxD+ | Transmitted/Received Data + | Input/Output | Required |
| TxD−/RxD− | Transmitted/Received Data − | Input/Output | Required |

APPENDIX C—RS-422 ELECTRICAL INTERFACE

TABLE XXXV

| Signal Description | | Type | Signal |
|---|---|---|---|
| Common Ground | | N/A | Optional |
| TxD+ | Transmitted Data + | Input | Required |
| TxD − | Transmitted Data − | Output | Required |
| RxD+ | Received Data + | Input | Required |
| RxD− | Received Data − | Output | Required |
| CTS+ | Clear To Send + | Input | Optional |
| CTS− | Clear To Send − | Output | Optional |
| RTS+ | Request To Send + | Input | Optional |
| RTS− | Request To Send − | Output | Optional |

APPENDIX D—20 mA-TTY ELECTRICAL INTERFACE

TABLE XXXVI

|  | Signal Description | Type | Signal |
|---|---|---|---|
| TxD+ | Transmitted Data + | Input | Required |
| TxD− | Transmitted Data − | Output | Required |
| RxD+ | Received Data + | Input | Required |
| RxD− | Received Data − | Output | Required |
| 20 mA− | 5 V ground | N/A | Required |
| 20 mA+ ($I_1$) | 20 mA current generator 1 | Output | Required |
| 20 mA+ ($I_2$) | 20 mA current generator 2 | Output | Required |

APPENDIX E—USB ELECTRICAL INTERFACE

TABLE XXXVII

| Signal Description | Type | Signal |
|---|---|---|
| VBUS | N/A | Required |
| D− | N/A | Required |
| D+ | N/A | Required |
| Common Ground | N/A | Required |

FIG. 1 is a block diagram of an exemplary embodiment of a system 1000, which can comprise a programmable logic controller 100. Programmable logic controller 100 can comprise and/or be communicatively coupled to an input/output module 1200. Input/output module 1200 can be communicatively coupled to any desired number of sensors, such as sensor 1300. Input/output module 1200 can be communicatively coupled to any desired number of actuators, such as actuator 1350. Via the control program, programmable logic controller 1100 can be adapted to receive information from sensor 1300 and/or, via a control program, control actuator 1350 in hard real time.

Programmable logic controller 1100 can be comprised and/or be communicatively coupled to a communications port 1400. Programmable logic controller 1100 can comprise a controller 1150, which can be adapted to enable a customer application program to access and control the serial communications port via each of a Freeport protocol, a predefined master protocol, and a predefined slave protocol.

In certain exemplary embodiments, controller 1150 can be adapted to:
provide start condition and/or end condition support;
provide STEP 7 configuration support;
provide system function parameterization support;
provide support for accessing and setting RS-232 control signals for increased flexibility of control when interfacing to $3^{rd}$ party communication devices;
allow parameterization support to be specified and provided from an engineering station's hardware configuration;
permit dynamic parameterization from a user program;
provide Explicit parameterization and control of a UART's Request-To-Send and Data-Terminal-Ready signals;
permit a customer to specify multiple, different character sequences, that include don't-care characters, to satisfy a series of different start and/or end conditions;
to permit a customer to specify where length information will be embedded within a customer's protocol;
provide a start condition system function that allows a user to define a start condition via a set of start condition parameters, the set of start condition parameters comprising a parameter that causes a recognition of a beginning of a message transmitted via a serial communications port connected to a programmable logic controller (PLC), the message preceded by a plurality of predetermined sequential start characters, the plurality of predetermined sequential start characters one of the set of start condition parameters; and/or
provide an end condition system function that allows a user to define an end condition via a set of end condition parameters, the set of end condition parameters comprising a parameter that causes a recognition of an end of the message, the message followed by a plurality of predetermined sequential end characters, the plurality of predetermined sequential end characters one of the set of end condition parameters.

In certain exemplary embodiments, programmable logic controller 1100 can be adapted to:
provide a set of system functions adapted for use by a customer application program to access and control the serial communications port via each of a Freeport protocol, a predefined master protocol, and a predefined slave protocol;
provide a parameter system function that dynamically configures send parameters for the message;
provide a configuration system function that dynamically configures receive parameters for the message;
provide a transmission system function that initiates sending the message;
provide a transmission system function that initiates sending the message, the transmission system function adapted to generate an error message if the message is not sent;
provide a transmission system function that initiates sending the message, the transmission system function adapted to identify a starting location of a transmit buffer that stores the message;
provide a reception system function that initiates reception of the message;
provide a reception system function that initiates reception of the message, the reception system function adapted to generate an error message if the message is not received;
provide a reception system function that initiates reception of the message, the reception system function adapted to identify a starting location of a receive buffer that stores the message;
provide a reset system function that resets a receive buffer adapted to store the message;
provide a message system function that defines a length of the message;
provide a configuration system function that disables the programmable logic controller from recognizing the plurality of predetermined sequential start characters;
permit dynamic parameterization from a user program;
provide explicit parameterization and control of a UART's Request-To-Send and Data-Terminal-Ready signals;
permit a customer to specify multiple, different character sequences, that include don't-care characters, to satisfy a series of different start and/or end conditions; and/or
permit a customer to specify where length information will be embedded within a customer's protocol.

Programmable logic controller 100 can be communicatively coupled to an information device 1600 via a network 1500. Information device 1600 can comprise and/or be communicatively coupled to a user interface 1620 and a user program 1640. User program 1640 can be adapted to monitor and/or control one or more activities associated with programmable logic controller 1100 such as creating, modifying, and/or compiling the control program. User interface 1620 can be adapted to render information regarding programmable logic controller 1100 such as information regarding creating, modifying, and/or compiling the control program. In certain exemplary embodiments information device 1600 can be an engineering workstation.

Figure 2:
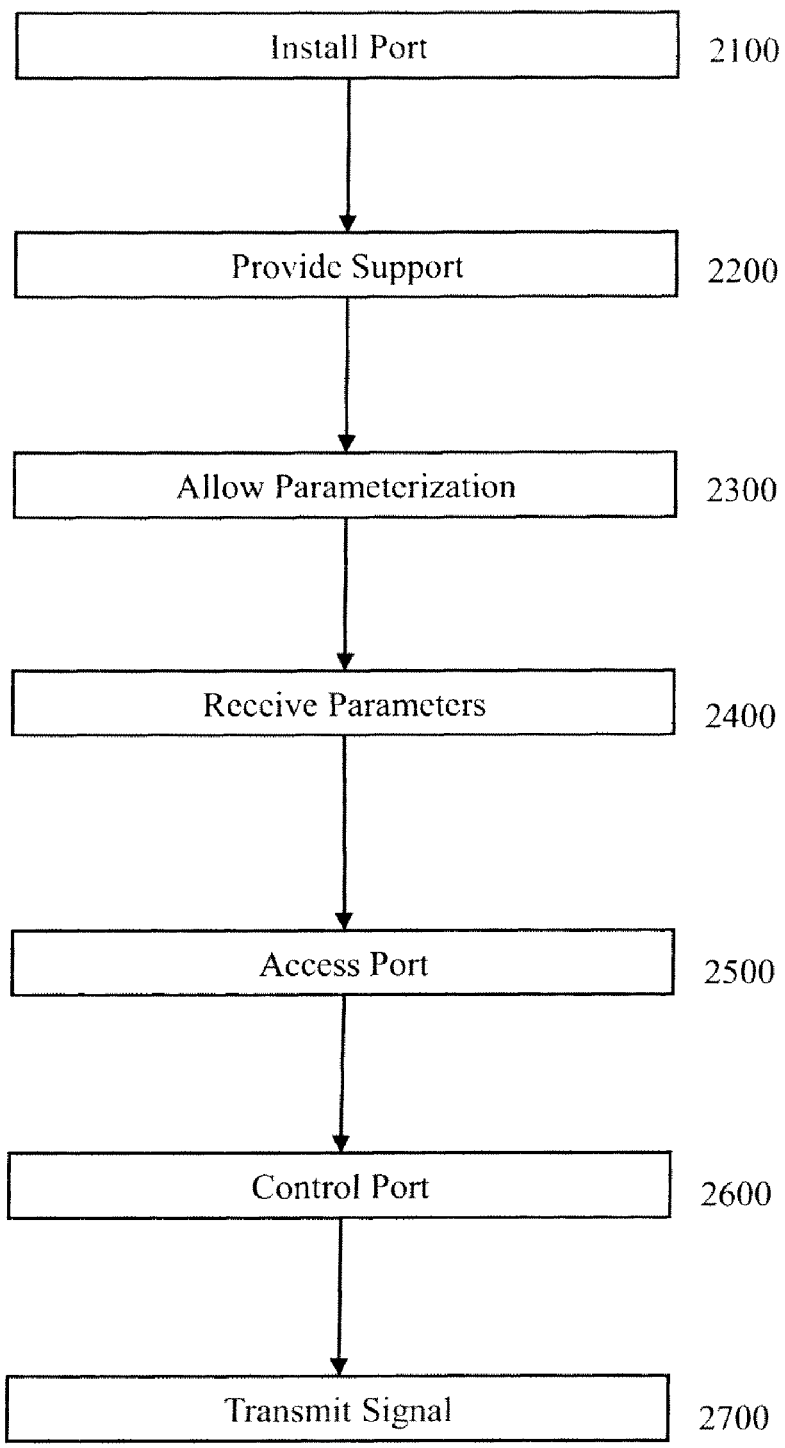
FIG. 2 is a flowchart of an exemplary embodiment of a method 2000.

FIG. 2 is a flowchart of an exemplary embodiment of a method 2000. Any set or subset of the activities of method 2000 can be performed automatically, such as via computer-implementable instructions stored on a computer-readable medium. At activity 2100, a port can be installed in a programmable logic controller (PLC). In certain exemplary embodiments, the port can be adapted for serial communications.

At activity 2200, the PLC can be adapted to provide support for one or more predetermined functions. For example, the PLC can be adapted to provide:
 "Start and End Condition" support;
 "STEP 7+ configuration support";
 "System Function" parameterization support; and/or
 support for accessing and setting RS-232 control signals for increased flexibility of control when interfacing to $3^{rd}$ party communication devices.

At activity 2300, parameterization can be allowed and/or performed. Certain exemplary embodiments can allow parameterization support to be specified and provided from an Engineering Station's hardware configuration. Certain exemplary embodiments can provide Explicit parameterization and control of a UART's Request-To-Send and Data-Terminal-Ready signals.

At activity 2400, the parameters can be received by the programmable logic controller. Certain exemplary embodiments can be adapted to permit a customer to specify multiple, different character sequences, that include don't-care characters, to satisfy a series of different start and/or end conditions.

At activity 2500, a user program and/or a control program can access the port. Certain exemplary embodiments can enabling a customer application program to access and control a serial communications port connected to a programmable logic controller (PLC).

At activity 2600, the port can be controlled. Certain exemplary embodiments can be adapted to enable a customer application program to access and control a serial communications port connected to a PLC. The PLC can be adapted to enable a customer application program to access and control the serial communications port via each of a Freeport protocol, a predefined master protocol, and a predefined slave protocol. Certain exemplary embodiments can via a controller, enable a customer application program to access and control a serial communications port connected to a programmable logic controller (PLC). The controller can be adapted to perform one or more of the following functions:
 provide start condition and/or end condition support;
 provide STEP 7 configuration support;
 provide system function parameterization support;
 provide support for accessing and setting RS-232 control signals for increased flexibility of control when interfacing to $3^{rd}$ party communication devices;
 allow parameterization support to be specified and provided from an engineering station's hardware configuration;
 permit dynamic parameterization from a user program;
 provide Explicit parameterization and control of a UART's Request-To-Send and Data-Terminal-Ready signals;
 permit a customer to specify multiple, different character sequences, that include don't-care characters, to satisfy a series of different start and/or end conditions;
 to permit a customer to specify where length information will be embedded within a customer's protocol;
 provide a start condition system function that allows a user to define a start condition via a set of start condition parameters, the set of start condition parameters comprising a parameter that causes a recognition of a beginning of a message transmitted via a serial communications port connected to a programmable logic controller (PLC), the message preceded by a plurality of predetermined sequential start characters, the plurality of predetermined sequential start characters one of the set of start condition parameters; and/or
 provide an end condition system function that allows a user to define an end condition via a set of end condition parameters, the set of end condition parameters comprising a parameter that causes a recognition of an end of the message, the message followed by a plurality of predetermined sequential end characters, the plurality of predetermined sequential end characters one of the set of end condition parameters.

At activity 2700, a signal can be transmitted via the port. The signal can be serially transmitted such as via a UART and/or an RS-232 interface.

Figure 3:
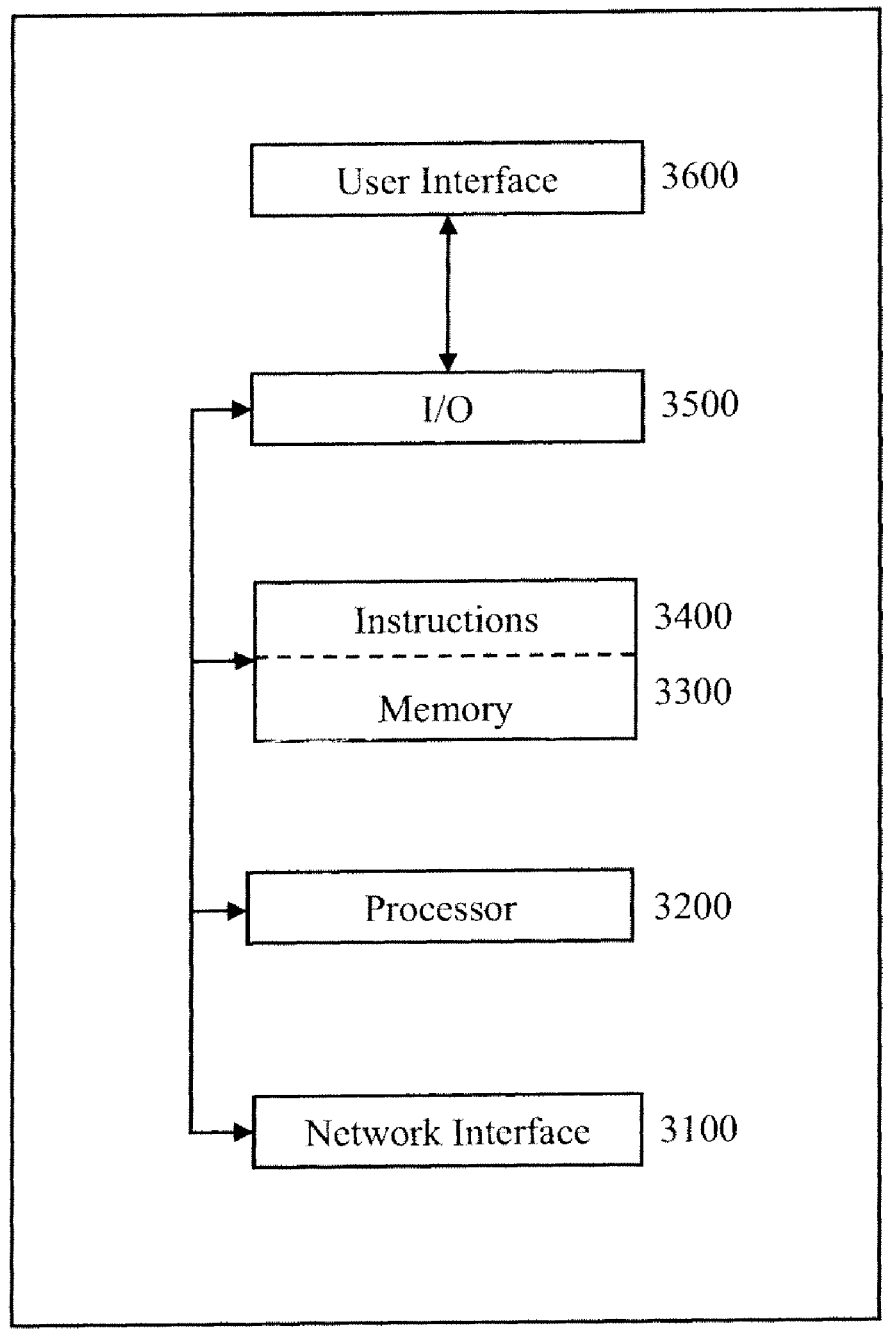
FIG. 3 is a block diagram of an exemplary embodiment of an information device 3000.

FIG. 3 is a block diagram of an exemplary embodiment of an information device 3000, which in certain operative embodiments can comprise, for example, information device 1600 of FIG. 1. Information device 3000 can comprise any of numerous circuits and/or components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.
 a—at least one.
 3rd party—a supplier of an accessory to a programmable logic controller that is not a supplier of the programmable logic controller.
 access—(n) a permission, liberty, right, mechanism, or ability to enter, approach, communicate with and/or through, make use of, and/or pass to and/or from a place, thing, and/or person; (v) to enter, approach, communicate with and/or through, make use of, and/or pass to and/or from.

activity—an action, act, deed, function, step, and/or process and/or a portion thereof.

adapted to—suitable, fit, and/or capable of performing a specified function.

allow—to provide, let do, happen, and/or permit.

application program—a plurality of computer-implementable instructions configured to process information.

automatically—acting and/or operating in a manner essentially independent of external human influence and/or control. For example, an automatic light switch can turn on upon "seeing" a person in its view, without the person manually operating the light switch.

begin—to start.

buffer—a storage device for temporarily holding data until the computer is ready to receive or process the data.

can—is capable of, in at least some embodiments.

cause—to bring about, provoke, precipitate, produce, elicit, be the reason for, result in, and/or effect.

character sequence—an ordered series of sets of bits wherein each set of bits is interpretable as an alphanumeric symbol.

communication—a transmission and/or exchange of information.

comprising—including but not limited to, what follows.

condition—existing circumstance.

configure—to design, arrange, set up, shape, and/or make suitable and/or fit for a specific purpose.

connected—physically and/or logically linked.

control—(n) a mechanical or electronic device used to operate a computer and/or machine within predetermined limits; (v) to exercise authoritative and/or dominating influence over, cause to act in a predetermined manner, direct, adjust to a requirement, and/or regulate.

customer—a potential and/or actual purchaser of goods and/or services.

data—information represented in a form suitable for processing by an information device.

Data-Terminal-Ready signal—information indicating that human-machine interface is capable of receiving an input from, and/or rendering an output to, a user.

deadline—a time interval during which an activity's completion has more utility to a system, and after which the activity's completion has less utility. Such a time interval might be constrained only by an upper-bound, or it might be constrained by both upper and lower bounds.

define—to establish the meaning, relationship, outline, form, and/or structure of; and/or to precisely and/or distinctly describe and/or specify.

device—an instrumentality adapted to a particular purpose.

different—changed, distinct, and/or separate.

disable—to deprive of capability and/or effectiveness.

don't care character—a set of bits adapted to represent a symbol indicative of a lack of preference for any particular alternative of a predetermined set of alternatives.

dynamic—time-varying.

dynamically—on demand or as necessary.

each—every one of a group considered individually.

embed—to include, insert, implant, and/or attach.

enable—to render capable for a task.

end condition—one or more characteristics that delineate a termination of a message.

engineering station—an information device adapted to communicate with, program, and/or configure a programmable logic controller.

error—an unintended result of a signal transmission.

explicit parameterization—a set of configuration values that are precisely, clearly, and distinctly defined, stored, rendered, and/or expressed.

flexible—adapted for use with relative ease.

follow—to take place at a later time.

Freeport protocol—a set of rules adapted to allow a user program to establish all communications settings of a communications port of a programmable logic controller.

from—used to indicate a source.

further—in addition.

generate—to create, produce, render, give rise to, and/or bring into existence.

haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counter-productive, such as when firefighters enter a burning building to search for a missing person seconds before the building collapses, resulting in injury or death to the firefighters). The scheduling criterion for a hard deadline is to always meet the hard deadline, even if it means changing the activity to do so.

hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers.

hardware—tangible components of an information device.

Human Machine Interface—hardware and/or software adapted to render information to a user and/or receive information from the user.

identify—to specify, recognize, detect, and/or establish the identity, origin, nature, and/or definitive characteristics of.

increase—to become greater or more in size, quantity, number, degree, value, intensity, and/or power, etc.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

Input/Output (I/O) device—an input/output (I/O) device of an information device can be any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

interface—(n) a boundary across which two independent systems meet and act on and/or communicate with each other. (v) to connect with and/or interact with by way of an interface.

initiate—to begin.

length—a longest dimension of something and/or the measurement of the extent of something along its greatest dimension.

location—a place.

computer-implementable instructions—directions adapted to cause a computer, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

computer-readable medium—a physical structure from which a computer, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

message—a communication.

method—a process, procedure, and/or collection of related activities for accomplishing something.

multiple—more than one.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

not—a negation of something.

parameter—a sensed, measured, and/or calculated value.

permit—to allow.

permitted—to allow.

plurality—the state of being plural and/or more than one.

precede—to take place at a prior time.

predefined—established in advance.

predefined master protocol—a set of rules of a communication port of a programmable controller, the set of rules defined for a communication in which a response is requested of a slave device by a master device.

predefined slave protocol—a set of rules of a communication port of a programmable controller, the set of rules defined for a communication in which a response is provided from a slave device in response to a request from a master device.

predetermined—determine, decide, or establish in advance.

processor—a hardware, firmware, and/or software machine and/or virtual machine comprising a set of computer-implementable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, igniters, tape drives, speakers, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in IEC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control.

provide—to furnish, supply, give, convey, send, and/or make available.

providing—furnishing or supplying.

real-time—a system (or sub-system) characterized by time constraints on individual activities and scheduling criteria for using those time constraints to achieve acceptable system timeliness with acceptable predictability.

receive—to gather, take, acquire, obtain, accept, get, and/or have bestowed upon.

reception—a state of being received.

recognize—to perceive or show acceptance of the validity of.

recognition—an automated conversion of information, as words or images, into a form that can be processed by a computer.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

request—(v.) to express a need and/or desire for; to inquire and/or ask for. (n.) that which communicates an expression of desire and/or that which is asked for.

Request-To-Send signal—a signal adapted to instruct a device and/or system to transmit data.

reset—to clear and/or change a setting.

RS 232—a standard for serial binary data signals connecting between a DTE (Data Terminal Equipment) and a DCE (Data Circuit-terminating Equipment).

said—when used in a system or device claim, an article indicating a subsequent claim term that has been previously introduced.

satisfy—meet at least one criterion.

send—to convey, dispatch, and/or transmit.

sequential—ordered in time.

serial communications port—a physical interface through which information transfers in or out one bit at a time.

series—a sequential set.

set—(n) to establish a condition and/or value of a parameter and/or variable; (v) a related plurality of predetermined elements; and/or one or more distinct items and/or entities having a specific common property or properties.

signal—information, such as computer-implementable instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

soft deadline—the general case where completing an activity by a deadline results in a system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with an anti-lock braking system where a slow down in response would likely cause system failure, possibly even catastrophic failure.

specify—to describe, characterize, indicate, and/or state explicitly and/or in detail.

start—to begin.

start condition—characteristics that delineate a beginning of a message.

STEP 7 configuration—a physical, logical, and/or logistical arrangement of elements adapted for use by a Siemens STEP 7 programmable logic controller.

STEP 7+ configuration—a physical, logical, and/or logistical arrangement of elements adapted for use by a Siemens STEP 7+ programmable logic controller.

store—to place, hold, retain, enter, and/or copy into and/or onto a computer-readable medium.

support—to provide hardware, firmware, and/or software to perform a specified function.

system—a collection of mechanisms, devices, machines, articles of manufacture, processes, data, and/or instructions, the collection designed to perform one or more specific functions.

system function—a predetermined set of computer-implementable instructions adapted to interface with a user program to perform a predetermined programmable logic controller task such as configuring a communications port, initiating a communication via the communication port, causing a communication via the communication port to terminate, cause a transmission of information to a programmable logic controller from a predetermined sensor at a predetermined time, and/or causing a transmission of information from the programmable logic controller to a predetermined actuator at a predetermined time, etc.

system function parameterization—an assignment of values of settings adapted to cause a programmable logic controller to perform a system function.

transmission—a conveyance of information from one location to another.

transmit—to provide, furnish, supply, send as a signal, and/or to convey (e.g., force, energy, and/or information) from one place and/or thing to another.

universal asynchronous receiver/transmitter (UART)—a piece of computer hardware that translates data between parallel and serial forms.

use—to put into service.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.
when—at a time.
where—in a situation or position.
wherein—in regard to which; and; and/or in addition to.
within—inside.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A system, comprising:
a controller adapted to:
provide a start condition system function that allows a user to define a start condition via a set of start condition parameters, said set of start condition parameters comprising a parameter that causes a recognition of a beginning of a message transmitted via a serial communications port connected to a programmable logic controller (PLC), said message preceded by a plurality of predetermined sequential start characters, said plurality of predetermined sequential start characters one of said set of start condition parameters, wherein the transmitted message includes the sequential start characters, and wherein the predetermined sequential start characters determine whether the message is received;
provide an end condition system function that allows a user to define an end condition via a set of end condition parameters, said set of end condition parameters comprising a parameter that causes a recognition of an end of said message, said message followed by a plurality of predetermined sequential end characters, said plurality of predetermined sequential end characters one of said set of end condition parameters, and
wherein said controller is adapted to permit a customer to specify multiple, different character sequences, that include don't-care characters, to satisfy a series of different start and/or end conditions; and
wherein a don't care character is a set of bits adapted to represent a symbol indicative of a lack of preference for any particular alternative of a predetermined set of alternatives.

2. The system of claim 1, wherein:
said controller is adapted to provide a set of system functions adapted for use by a customer application program to access and control said serial communications port via each of a Freeport protocol, a predefined master protocol, and a predefined slave protocol.

3. The system of claim 1, wherein:
said controller is adapted to provide a parameter system function that dynamically configures send parameters for said message.

4. The system of claim 1, wherein:
said controller is adapted to provide a configuration system function that dynamically configures receive parameters for said message.

5. The system of claim 1, wherein:
said controller is adapted to provide a transmission system function that initiates sending said message.

6. The system of claim 1, wherein:
said controller is adapted to provide a transmission system function that initiates sending said message, said transmission system function adapted to generate an error message if said message is not sent.

7. The system of claim 1, wherein:
said controller is adapted to provide a transmission system function that initiates sending said message, said transmission system function adapted to identify a starting location of a transmit buffer that stores said message.

8. The system of claim 1, wherein:
said controller is adapted to provide a reception system function that initiates reception of said message.

9. The system of claim 1, wherein:
said controller is adapted to provide a reception system function that initiates reception of said message, said reception system function adapted to generate an error message if said message is not received.

10. The system of claim 1, wherein:
said controller is adapted to provide a reception system function that initiates reception of said message, said reception system function adapted to identify a starting location of a receive buffer that stores said message.

11. The system of claim 1, wherein:
said controller is adapted to provide a reset system function that resets a receive buffer adapted to store said message.

12. The system of claim 1, wherein:
said controller is adapted to provide a message system function that defines a length of said message.

13. The system of claim 1, wherein:
said controller is adapted to provide a configuration system function that disables said programmable logic controller from recognizing said plurality of predetermined sequential start characters.

14. The system of claim 1, wherein:
said controller is adapted to permit dynamic parameterization from a user program.

15. The system of claim 1, wherein:
said controller is adapted to provide explicit parameterization and control of a UART's Request-To-Send and Data-Terminal-Ready signals.

16. The system of claim 1, wherein:
said controller is adapted to permit a customer to specify where length information will be embedded within a customer's protocol.

17. A method, comprising:
via a controller, enabling a customer application program to access and control a serial communications port connected to a programmable logic controller (PLC), said controller adapted to:
provide a system function that allows a user to define a start condition via a set of start condition parameters, said set of start condition parameters comprising a parameter that causes a recognition of a beginning of a message transmitted via said communications port, said message preceded by a plurality of predetermined sequential characters, said plurality of predetermined sequential characters one of said set of start condition parameters, wherein the transmitted message includes the sequential start characters, and wherein the predetermined sequential start characters determine whether the message is received;
provide a system function that allows a user to define an end condition via a set of end condition parameters, said set of end condition parameters comprising a parameter that causes a recognition of an end of said message, said message followed by a plurality of predetermined sequential characters, said plurality of predetermined sequential characters one of said set of end condition parameters; and
wherein said controller is adapted to permit a customer to specify multiple, different character sequences, that include don't-care characters, to satisfy a series of different start and/or end conditions; and
wherein a don't care character is a set of bits adapted to represent a symbol indicative of a lack of preference for any particular alternative of a predetermined set of alternatives.

18. A computer-readable medium comprising computer-implementable instructions for activities comprising:
via a controller, enabling a customer application program to access and control a serial communications port connected to a programmable logic controller (PLC), said controller adapted to:
provide a system function that allows a user to define a start condition via a set of start condition parameters, said set of start condition parameters comprising a parameter that causes a recognition of a beginning of a message transmitted via said communications port, said message preceded by a plurality of predetermined sequential characters, said plurality of predetermined sequential characters one of said set of start condition parameters, wherein the transmitted message includes the sequential start characters, and wherein the predetermined sequential start characters determine whether the message is received; and
provide a system function that allows a user to define an end condition via a set of end condition parameters, said set of end condition parameters comprising a parameter that causes a recognition of an end of said message, said message followed by a plurality of predetermined sequential characters, said plurality of predetermined sequential characters one of said set of end condition parameters; and
wherein said controller is adapted to permit a customer to specify multiple, different character sequences, that include don't-care characters, to satisfy a series of different start and/or end conditions; and
wherein a don't care character is a set of bits adapted to represent a symbol indicative of a lack of preference for any particular alternative of a predetermined set of alternatives.

* * * * *